United States Patent
Wu et al.

(10) Patent No.: US 10,852,871 B1
(45) Date of Patent: Dec. 1, 2020

(54) TOUCH PANEL AND LED DISPLAY

(71) Applicant: SHENZHEN AOTO ELECTRONICS CO., LTD., Shenzhen (CN)

(72) Inventors: Zhenzhi Wu, Shenzhen (CN); Yu Liu, Shenzhen (CN); Xuanzhong Li, Shenzhen (CN); Hanqu Wu, Shenzhen (CN)

(73) Assignee: SHENZHEN AOTO ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 16/632,294

(22) PCT Filed: Dec. 20, 2017

(86) PCT No.: PCT/CN2017/117510
§ 371 (c)(1),
(2) Date: Jan. 17, 2020

(87) PCT Pub. No.: WO2019/015248
PCT Pub. Date: Jan. 24, 2019

(30) Foreign Application Priority Data

Jul. 17, 2017 (CN) .......................... 2017 1 0584655

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05)

(58) Field of Classification Search
CPC ............................. G06F 3/0412; G06F 3/0443
See application file for complete search history.

(56) References Cited

U.S. PATENT DOCUMENTS

2019/0213379 A1* 7/2019 Zhao ................... H01L 51/5284

FOREIGN PATENT DOCUMENTS

| CN | 102446012 A | 5/2012 |
| CN | 103293726 A | 9/2013 |
| CN | 103970312 A | 8/2014 |
| CN | 204945982 U | 1/2016 |
| CN | 106708342 A | 5/2017 |

* cited by examiner

*Primary Examiner* — Peter D McLoone
(74) *Attorney, Agent, or Firm* — Robert L. Stearns; Dickinson Wright PLLC

(57) ABSTRACT

A touch panel and an LED display screen comprises at least one touch-sensing layer, at least one pixel lamp spacer layer and at least one dielectric substrate layer, sequentially laminated. The touch-sensing layer includes a plurality of sensing units arranged at intervals and at least one grounding unit, wherein the sensing unit is not in contact with the ground unit; the ground unit is independently arranged or connected to any number of other ground units; the sensing unit is configured to sense a touch-control signal. The ground unit is configured to be grounded. A plurality of through-holes arranged at intervals are provided on the pixel lamp spacer layer, the through-hole is provided below the gap of the touch-sensing layer, and the through-holes are configured for receiving LED pixel lamps. The dielectric substrate layer is provided with several via holes.

9 Claims, 3 Drawing Sheets

TOUCH PANEL AND LED DISPLAY

CROSS REFERENCE TO RELATED APPLICATIONS

The present application is a 35 U.S.C. § 371 national stage application of PCT Application Ser. No. PCT/CN2017/117510 filed on Dec. 20, 2017, which claims priority to Chinese Patent Application Ser. No. CN201710584655.1 filed on Jul. 17, 2017, the entire contents of which are incorporated herein by reference in their entireties.

TECHNICAL FIELD

The present application relates to the technical field of touch display, and more particularly to a touch panel and an LED display screen.

BACKGROUND

With the continuous development of LED display technology, the capacitance-type touch technology has been widely used in LED display screens of various electronic products, the function of intelligent touch for electronic products are achieved, and thus greatly improves the usability of electronic products.

Technical Problem

The existing capacitance-type touch technology is merely applicable to small-sized display screens, while regarding display for conference, display for television program, display for exhibition and other occasions, large-sized touch screens are usually required, that is, the existing capacitance-type touch technology could not be able to satisfy the increasing demand for large-sized touch display. It thus is expected urgently to provide a capacitance-type touch technology that can be applied to a large-sized display screen.

Technical Solutions

An embodiment of the present application provides a touch panel and an LED display screen, which are applicable to large-sized display screens and implements the function of touch display for the large-sized display screen, and have the advantages of low production cost and simple processing technology.

An aspect of the embodiment of the present application provides a touch panel, which includes at least one touch-sensing layer, at least one pixel lamp spacer layer and at least one dielectric substrate layer, which are sequentially laminated.

The touch-sensing layer includes a plurality of sensing units arranged at intervals and at least one grounding unit, and a gap is provided between the sensing unit and the grounding unit. The sensing units are configured to sense a touch signal to control an LED pixel lamp. The grounding unit is configured to be grounded;

The pixel lamp spacer layer are provided with a plurality of through-holes arranged at intervals, in which the through-hole is arranged corresponding to the gap between the sensing unit and the ground unit, and communicates with the gap corresponded thereto. The through-holes are configured for receiving the LED pixel lamps.

In one embodiment, the dielectric substrate is provided with a plurality of vias, the sensing units, the ground unit, and the LED pixel lamps, by wires passing through the vias, are all coupled to a touch-sensing circuit disposed on a side of the dielectric substrate layer facing away the touch-sensing layer.

In one embodiment, one of the sensing units is adjacent to at least one of the LED pixel lamps.

In one embodiment, both the sensing unit and the ground unit are made of a conductive material, the conductive material may be a metal conductive material or a non-metal conductive material, and the metal conductive material may be a copper foil, an aluminum foil, a copper alloy film or aluminum alloy film, the non-metal conductive material may be conductive rubber, conductive plastic or conductive fiber fabric.

In one embodiment, both the pixel lamp spacer layer and the dielectric substrate layer are made of an insulating material, and the insulating material may be a glass fiber board, a liquid crystal polymer film, a resin or a ceramic.

In one embodiment, the touch panel further includes a solder resist ink layer coated on a surface of the touch-sensing layer away from the dielectric substrate layer, or a fire-resistant material layer disposed on the surface of the touch-sensing layer away from the dielectric substrate layer.

In one embodiment, cross-sections of the sensing unit and the ground unit are both octagonal, a cross-section of the through-hole is circular, and the octagon includes four curved edges and four straight edges alternately distributed. Adjacent edges of adjacent sensing units or ground units are straight edges that are parallel to each other, and the curved edges of the sensing units or ground units are parallel to arcs of a cross-section of the through-holes adjacent thereto; wherein the cross-section refers to a cross-section parallel to the touch panel.

In one embodiment, cross-sections of the sensing unit, the ground unit and the through-hole are square; wherein the cross-section refers to a cross-section parallel to the touch panel.

An embodiment of the present application further provides an LED touch display screen, which includes the touch panel as above described, and further includes a touch-sensing circuit;

The touch-sensing circuit includes at least one touch-sensing module correspondingly connected to at least one of the sensing units;

The touch-sensing module is configured to input a touch signal via the sensing unit connected therewith and process the touch signal.

In one embodiment, the touch-sensing circuit further includes a current-limiting resistor, a reference capacitor, a bypass capacitor and a serial command input port;

A touch-signal output end of the touch-sensing module is connected with a power source via the current-limiting resistor, a negative power end of the touch-sensing module is grounded, and a touch-signal input end of the touch-sensing module is connected with its corresponding sensing unit, a reference-capacitor input end of the touch-sensing module is grounded via a reference capacitor, a positive power end of the touch-sensing module is connected with a power source and grounded via a bypass capacitor, and the touch-signal output-type selection end of the touch-sensing module is grounded via the serial command input port, and the serial command input port is configured to input a serial command.

In one embodiment, the touch-sensing circuit further includes an LED indicator, and the LED indicator is connected between the touch-signal output end and the current-limiting resistor.

BENEFICIAL EFFECT

In the embodiment of the present application, the touch panel is constituted by a laminated stack of a touch-sensing layer, a pixel lamp spacer layer and a dielectric substrate layer, and the touch signal is sensed by a sensing unit on the touch-sensing layer, so that the size of the touch panel can be set according to needs, while the function of touch display is achieved, thereby it can be widely used in large-sized capacitance-type touch display screens, and possess the advantages of low production cost and simple processing technology.

BRIEF DESCRIPTION OF DRAWINGS

In order to illustrate the technical solutions of embodiments of the present application more clearly, the drawings used in the description of the embodiments will be briefly introduced hereinbelow. Obviously, the drawings in the following description are some embodiments of the present application, and for persons skill in the art, other drawings may also be obtained on the basis of these drawings without any creative work.

DETAILED DESCRIPTION OF THE EMBODIMENTS

In order to enable persons skilled in the art to better understand the technical solutions of embodiments, the technical solution of the embodiments will be clearly described hereinbelow with reference to the drawings of the embodiments. Obviously, the embodiments described hereinbelow are part of the embodiments of the present application, not all embodiments thereof. On the bases of these embodiments, all other embodiments obtained by persons skill in the art without creative efforts fall within the protection scope of the present application.

The term "comprising" and any variants thereof in the description and claims of the present application and in the above-mentioned drawings are intend for explanation rather than limitation. For example, a process, a method or system, a product or equipment containing a series of steps or units are not limited to the listed steps or units, optionally steps or units not listed may also be included, or optionally other steps or units inherent to these processes, methods, products or equipment may also be included. In addition, the terms "first", "second", "third" and the like are used to distinguish different objects but not intend to describe specific orders.

Embodiment 1

Figure 1:
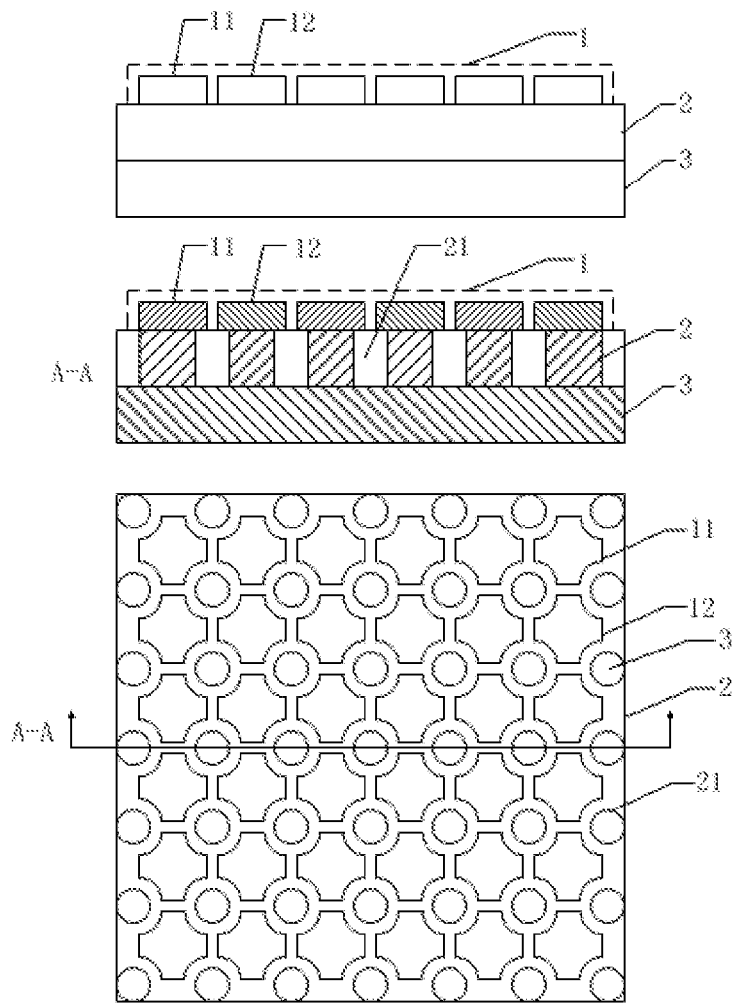
FIG. 1 is a front view, a top view and a cross-sectional view taken along A-A of the top view of a touch panel as provided in Embodiment 1 of the present application.

As shown in FIG. 1, this embodiment provides a touch panel, which includes at least one touch-sensing layer 1, at least one pixel lamp spacer layer 2 and at least one dielectric substrate layer 3, which are sequentially laminated.

FIG. 1 exemplarily illustrates a touch-sensing layer 1, a pixel lamp spacer layer 2 and a dielectric substrate layer 3.

In specific applications, the number of layers of the touch-sensing layer 1, the pixel lamp spacer layer 2 or the dielectric substrate layer 3 can be set according to actual needs. For example, two pixel lamp spacer layers and two dielectric substrate layers may be provided so as to increase the thickness of the pixels lamp spacer layer 2 and the dielectric substrate layer 3 to facilitate a wiring.

As shown in the top view in FIG. 1, the touch-sensing layer 1 includes a plurality of sensing units 11 arranged at intervals and at least one grounding unit 12. A gap is provided between the sensing unit 11 and the grounding unit 12. The grounding unit 12 may be independently provided or connected with any numbers of other grounding units 12, the sensing unit 11 is used for sensing a touch signal to control the LED pixel lamp, the grounding unit 12 is grounded, and both the sensing unit 11 and the grounding unit 12 are made of conductive materials.

In specific applications, the number of the sensing unit 11 and the ground unit 12 can be set according to actual needs.

In one embodiment, the number of the sensing units 11 and the ground units 12 may be equal.

In a specific application, the touch-sensing layer 1 includes at least one grounding unit 12, when the touch-sensing layer 1 includes two or more grounding units 12, all grounding units 12 may be coupled with each other and connected to a common ground. For example, the grounding units 12 are coupled by wires passing through vias on the dielectric substrate layer 3 to be grounded.

In one embodiment, one sensing unit 11 is adjacent to at least one LED pixel lamp.

In specific applications, one sensing unit 11 corresponds to one LED pixel lamp or corresponds to two or more LED pixel lamps; the number of LED pixel lamps corresponding to this sensing unit 11 is determined by the density of the LED pixel lamps.

In specific applications, the touch signal sensed by the sensing unit 11 specifically refers to: when a human finger or a capacitance-type pen is in contact with the touch-sensing unit, a capacitance change is caused, thereby causing a current change and generating a touch signal.

In one embodiment, the conductive material is a metal conductive material or a non-metal conductive material. Any type of metal conductive material may be selected according to actual needs, for example, a film made of copper foil, aluminum foil or alloy materials, aluminum alloys such as copper alloys. Also, any type of non-metal conductive material may be selected according to actual needs, such as conductive rubber, conductive plastic, conductive fiber fabric and the like.

As shown in the cross-sectional view taken along the line AA in FIG. 1, the pixel lamp spacer layer 2 is provided with a plurality of through-holes 21 arranged at intervals. The through-holes 21 are arranged corresponding to the gaps between the sensing units 11 and the ground units 12 and communicate with the corresponding gaps, respectively, and the through-holes 21 are used for receiving the LED pixel lamps and spacing the adjacent LED pixel lamps.

A cross-sectional view taken along the line A-A in FIG. 1 exemplarily illustrates a situation where the number of the sensing units 11 and the grounding units 12 are equal.

In the specific embodiment illustrated in FIG. 1, the cross-section of the sensing unit 11 and the ground unit 12 are both octagonal, and the cross-section of the through-hole 21 is circular. The octagon includes four curved edges and four straight edges, in which the curved side and straight side are alternately distributed. Adjacent edges of adjacent sensing units 11 or grounding units 12 are parallel straight edges, and curved edges of sensing units 11 or grounding units 12 are parallel to the cross-section arcs of adjacent through-holes. The cross-section refers to a cross-section parallel to the touch panel.

In the specific embodiment shown in FIG. 1, the size of the sensing unit 11 and the grounding unit 12 are the same, and the distance between any adjacent sensing unit 11 or the grounding unit 12 is the same. The spacing between the sensing unit 11 or the grounding unit 12 and its adjacent vias are equal.

The structure shown in FIG. 1 can maximize the area of the touch-sensing layer 1, so that a good touching effect can be achieved when a touch panel based on this structure is applied to an LED display screen.

In specific applications, the shapes of cross-sections of the sensing unit 11, the grounding unit 12 and the through-hole 21 can be set according to actual needs.

The dielectric substrate layer 3 is provided with a plurality of vias (not shown in the figure). The sensing unit 11, the grounding unit 12, and the LED pixel lamp are all coupled to the touch-sensing circuit (not shown in the figure) provided on the dielectric substrate layer 3 on a side facing away from touch-sensing layer 1 by wires passing through the vias. The pixel lamp spacer layer 2 and the dielectric substrate layer 3 are made of insulating materials.

In specific applications, the thickness of the dielectric substrate layer 3 and the number of vias can be set according to actual needs.

In specific applications, any type of insulating material can be selected according to actual needs, such as glass fiber boards, liquid crystal polymer films, resins or ceramics and the like.

In one embodiment, the touch panel further includes a solder resist ink layer coated on an end surface of the touch-sensing layer away from the pixel lamp spacer layer 2 or a fire-resistant material layer disposed on the end surface of the touch-sensing layer away from the pixel lamp spacer layer 2.

In one embodiment, the fire-resistant material layer may be an FR-4 epoxy board.

In specific applications, any known preparation process can be selected to prepare the touch panel according to actual needs, for example, a COB process. The manufacturing process of the touch panel is not particularly limited in this embodiment.

In this embodiment, the touch panel is constituted by a laminated stack of the touch-sensing layer 1, the pixel lamp spacer layer 2 and the dielectric substrate layer 3, and the touch signal is sensed by the sensing unit of the touch-sensing layer, so that the size of the touch panel can be set according to actual needs, while the function of touch display is achieved, thereby it can be widely used in large-sized capacitance-type touch display screens, and possess the advantages of low production cost and simple processing technology.

Embodiment 2

Figure 2:
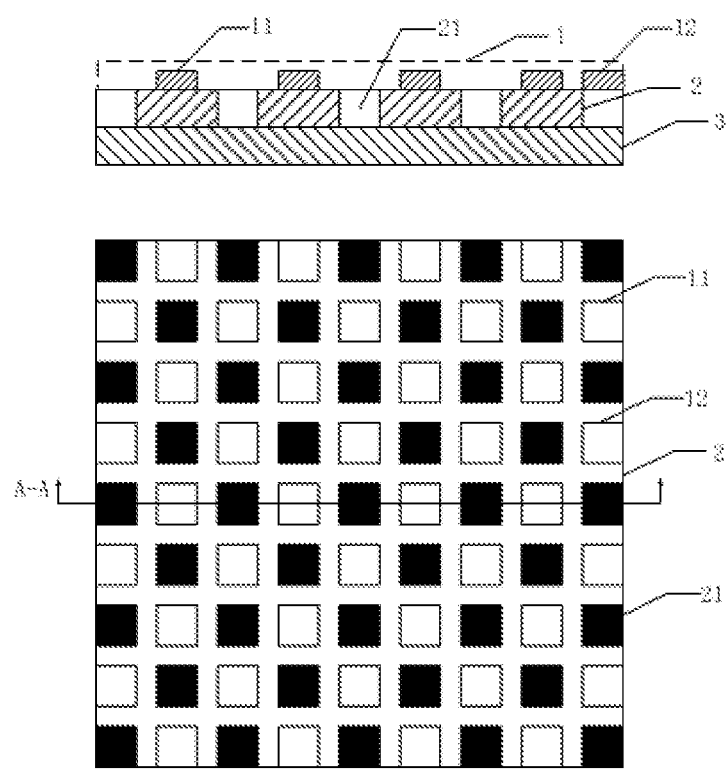
FIG. 2 is a top view and a cross-sectional view taken along A-A of the top view of a touch panel as provided in Embodiment 2 of the present application.

As shown in FIG. 2, in this embodiment, where the cross-section of the sensing unit 11, the ground unit 12 and the through-hole 21 (the black square in the figure indicates the through-hole 21) are all square, and the cross-section refers to a cross-section parallel to the touch panel.

In FIG. 2, the cross-sections of the sensing unit 11, the grounding unit 12 and the through-hole 21 are all squares with the same size. Where one through-hole 21 is surrounded with seven sensing units 11 and one grounding unit, and the other through-holes 21 are surrounded with eight sensing units.

In a specific application, the touch-sensing layer includes at least one ground unit.

Embodiment 3

Figure 3:
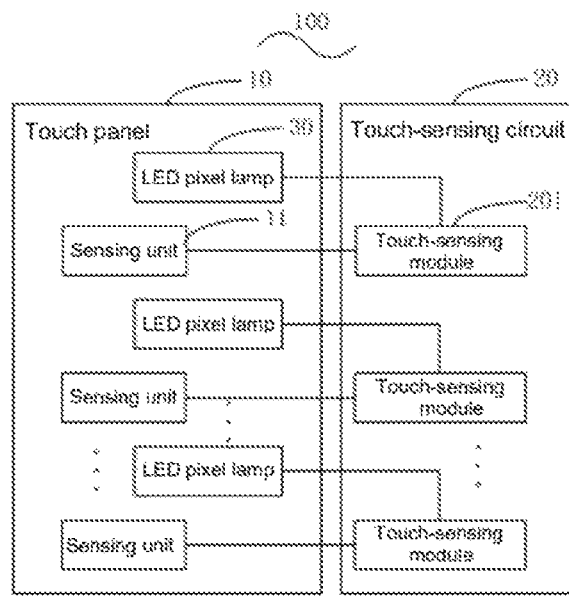
FIG. 3 is a schematic structural diagram of an LED touch display screen as provided in Embodiment 3 of the present application.

As shown in FIG. 3, an embodiment of this disclosure exemplarily illustrates an LED touch display screen 100, which includes the touch panel 10 as described in the above embodiment, and further includes a touch-sensing circuit 20 including at least one touch-sensing module 201. The touch-sensing module 201 is correspondingly connected to at least one sensing unit 11. The touch-sensing module 20 is configured to input a touch signal via the sensing unit 11 connected thereto and process the touch signal.

FIG. 3 exemplarily illustrates that the touch-sensing circuit 20 includes touch-sensing modules 201, the number of which is equal to the number of all sensing units 11, and each touch-sensing module 201 is connected to the corresponding one sensing unit 11, respectively.

In one embodiment, the touch-sensing circuit includes a touch-sensing module, and the touch-sensing module is connected to a plurality of sensing units, respectively.

Embodiment 4

Figure 4:
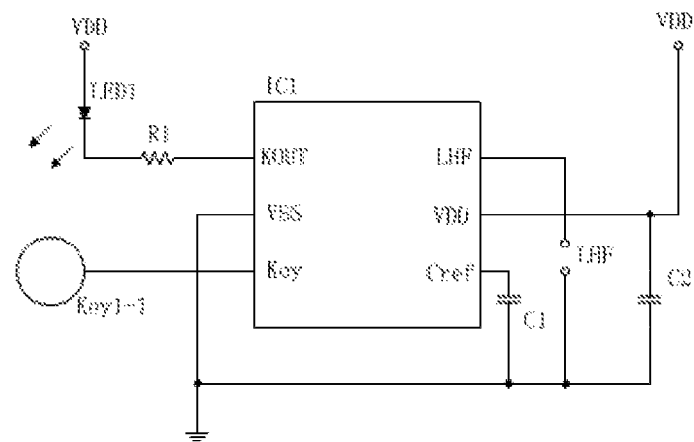
FIG. 4 is a schematic circuit structure diagram of a touch-sensing circuit as provided in Embodiment 4 of the present application.

As shown in FIG. 4, in one embodiment of the present application, the touch-sensing circuit 20 further includes a current-limiting resistor R1, a reference capacitor C1, a bypass capacitor C2 and a serial command input port LHF.

As shown in FIG. 4, in this embodiment, the touch-sensing module 201 is a touch-sensing chip IC1. A touch-signal output end KOUT of the touch-sensing chip IC1 is connected to the power supply VDD via the current-limiting resistor R1. A negative power end VSS is grounded, A touch-signal input end Key of the touch-sensing chip IC1 is connected to its corresponding sensing unit Key 1-1, A reference capacitance input end Cref of the touch-sensing chip IC1 is grounded via the reference capacitor C1. A positive power end VDD of the touch-sensing chip IC1 is connected to the power supply VDD and grounded via the bypass capacitor C2. The touch-signal output-type selection end LHF of the touch-sensing chip IC1 is grounded via the serial command input port LHF, and the serial command input port LHF is configured to input serial commands.

As shown in FIG. 4, in this embodiment, the touch-sensing circuit 20 further includes an LED indicator LED1, and the LED indicator LED1 is connected between the touch-signal output end KOUT and the current-limiting resistor R1.

In specific applications, the touch-sensing chip may be a BS801B type touch-sensing button chip, or any other type of chip may be selected according to actual needs.

In one embodiment, the touch-sensing chip is implemented by a universal integrated circuit, such as a CPU (Central Processing Unit, central processing unit), or by an ASIC (Application Specific Integrated Circuit, Application Specific Integrated Circuit).

The foregoing description are merely preferred embodiments of the present application, and are not intended to limit the present application; any modifications, equivalent substitutions and improvements made within the spirit and principles of the disclosure should be understood as being included within the scope of the present application.

What is claimed is:

1. A touch panel, comprising:
the touch panel comprising at least one touch-sensing layer, at least one pixel lamp spacer layer and at least one dielectric substrate layer, which are sequentially laminated;
the touch-sensing layer comprising a plurality of sensing units arranged at intervals and at least one grounding unit, wherein a gap is provided between the sensing unit and the grounding unit, the sensing unit is configured to sense a touch signal to control an LED pixel lamp, and the grounding unit is configured to be grounded; and
the pixel lamp spacer layer provided with a plurality of through-holes arranged at intervals, wherein the through-hole is provided corresponding to the gap between the sensing unit and the ground unit, and communicates with the gap corresponded thereto, and wherein the through-holes are configured for receiving the LED pixel lamps.

2. The touch panel according to claim 1, wherein the dielectric substrate layer is provided with a plurality of via holes, wherein the sensing unit, the ground unit and the LED pixel lamps, by wires passing through the via holes, are all coupled to a touch-sensing circuit disposed on a side of the dielectric substrate layer facing away from the touch-sensing layer.

3. The touch panel according to claim 1, wherein one of the sensing units is adjacent to at least one of the LED pixel lamps.

4. The touch panel according to claim 1, wherein the sensing unit and the ground unit are both made of a conductive material, wherein the conductive material is a metal conductive material or a non-metal conductive material, and the metal conductive material includes copper foil, aluminum foil, copper alloy film or aluminum alloy film, and the non-metal conductive material includes conductive rubber, conductive plastic or conductive fiber fabric.

5. The touch panel according to claim 1, wherein the pixel lamp spacer layer and the dielectric substrate layer are both made of an insulating material, wherein the insulating material includes a glass fiber board, a liquid crystal polymer film, a resin or a ceramic.

6. The touch panel according to claim 1, in that, further comprising a solder resist ink layer coated on a surface of the touch-sensing layer away from the dielectric substrate layer, or a fire-resistant material layer disposed on the surface of the touch-sensing layer away from the dielectric substrate layer.

7. The touch panel according to claim 1, wherein cross-sections of the sensing unit and the ground unit is octagonal, a cross-section of the through-hole is circular, and the octagon includes four curved edges and four straight edges alternately distributed, wherein adjacent edges of adjacent sensing units or grounding units are straight edges that are parallel to each other, and wherein the curved edges of the sensing units or the grounding units are parallel to arcs of a cross-section of the through-holes adjacent thereto; wherein the cross-section refers to a cross-section parallel to the touch panel.

8. The touch panel according to claim 1, wherein cross-sections of the sensing unit, the ground unit and the through-hole are square; wherein the cross-section refers to a cross-section parallel to the touch panel.

9. An LED touch display screen, comprising:
a touch comprising:
at least one touch-sensing layer, at least one pixel lamp spacer layer and at least one dielectric substrate layer, which are sequentially laminated;
the touch-sensing layer comprising a plurality of sensing units arranged at intervals and at least one grounding unit, wherein a gap is provided between the sensing unit and the grounding unit, the sensing unit is configured to sense a touch signal to control an LED pixel lamp, and the grounding unit is configured to be grounded; and
the pixel lamp spacer layer provided with a plurality of through-holes arranged at intervals, wherein the through-hole is provided corresponding to the gap between the sensing unit and the ground unit, and communicates with the gap corresponded thereto, and wherein the through-holes are configured for receiving the LED pixel lamps; the LED touch and a touch-sensing circuit;
wherein the touch-sensing circuit comprising at least one touch-sensing module correspondingly connected to at least one of the sensing units; and
wherein the touch-sensing module being configured to input a touch signal via a sensing unit connected to the touch-sensing module and process the touch signal.

* * * * *